US012663936B2

(12) United States Patent　　　(10) Patent No.:　　US 12,663,936 B2
Uretzky et al.　　　　　　　　　　(45) Date of Patent:　　Jun. 23, 2026

(54) DATA PROTECTION USING A TIMER-CONTROLLED IMMUTABLE JOURNAL

(71) Applicant: HEWLETT PACKARD ENTERPRISE DEVELOPMENT LP, Spring, TX (US)

(72) Inventors: Omer Uretzky, Herzliya (IL); Gil Barash, Herzliya (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/911,376

(22) Filed: Oct. 10, 2024

(65) Prior Publication Data

US 2026/0104813 A1　　Apr. 16, 2026

(51) Int. Cl.
*G06F 3/06*　　　　　(2006.01)

(52) U.S. Cl.
CPC .............. *G06F 3/065* (2013.01); *G06F 3/061* (2013.01); *G06F 3/0679* (2013.01)

(58) Field of Classification Search
CPC .......... G06F 3/061; G06F 3/062; G06F 3/065; G06F 3/0679
USPC ........................................................ 711/163
See application file for complete search history.

(56) References Cited

U.S. PATENT DOCUMENTS

2017/0031783 A1* 2/2017 Kedem ................ G06F 11/1471
2017/0083412 A1* 3/2017 Mamluk .................. G06F 3/065
2019/0207929 A1* 7/2019 Koorapati ............... G06F 16/11

OTHER PUBLICATIONS

Axis Security, About Axis downloaded Dec. 26, 2023 (4 pages).
Axis Security, Axis Security ZTNA Solution Versus VPN downloaded Dec. 26, 2023 (6 pages).
Barash et al., U.S. Appl. No. 18/495, 142 entitled File System Operations in Storage Devices filed Oct. 26, 2023 (32 pages).
Fortra's Data Classification Suite downloaded Dec. 26, 2023 (6 pages).
Kost, Upguard, How to Detect Data Exfiltration (Before It's Too Late), Feb. 16, 2023 (12 pages).
Next Labs, Understanding Data Classification downloaded Dec. 26, 2023 (7 pages).
Pham, Blumira, How to Detect Data Exfiltration, Nov. 22, 2022 (8 pages).
Uretzky et al., U.S. Appl. No. 18/418,551 entitled Access Control Based on Classification of Changed Data filed Jan. 22, 2024 (33 pages).

(Continued)

*Primary Examiner* — Than Nguyen
(74) *Attorney, Agent, or Firm* — Trop, Pruner & Hu, P.C.

(57)　　　　　　　ABSTRACT

In some examples, a data protection system replicates write input/output (I/O) operations to entries of a journal stored in a storage system, and associates timers with the entries of the journal to provide timer-controlled immutability of the entries of the journal. Based on a first timer associated with a first entry of the entries of the journal indicating that a specified time duration has elapsed, the data protection system applies a first write I/O operation of the first entry to a backup data store that contains a copy of at least a portion of data in a primary data store. Prior to the first timer indicating that the specified time duration has elapsed, the data protection system prevents any modification of a storage location containing the first entry in the storage system.

19 Claims, 4 Drawing Sheets

(56)     References Cited

OTHER PUBLICATIONS

Venafi, "Study: Seventy-four Percent of IT Decision Makers Say New Extortion Tactics Make Ransomware a National Security Threat", available online at<https://venafi.com/news-center/press-release/study-seventy-four-percent-it-decision-makers-say-new-extortion-tactics/>, Feb. 24, 2022, 6 pages.
Zerto, CDP downloaded Dec. 13, 2023 (2 pages).
Zerto, Virtual Replication Data Sheet, 2011 (2 pages).

* cited by examiner

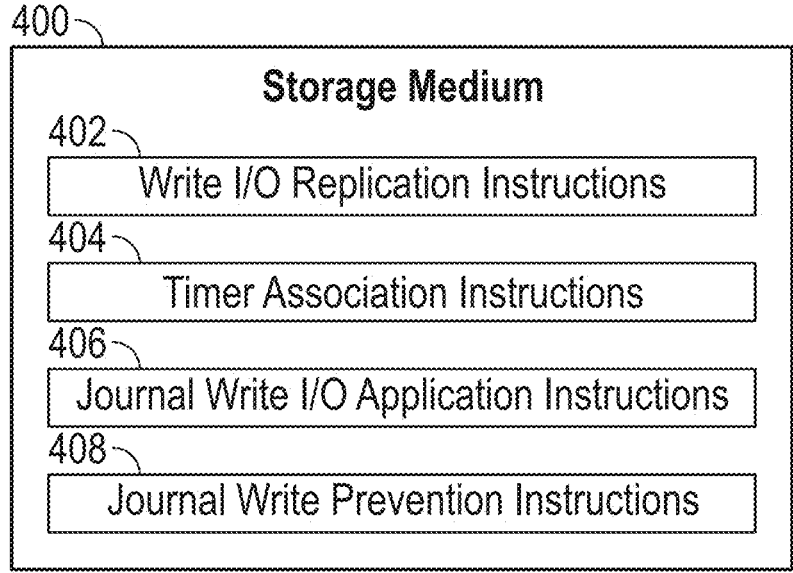

400

Storage Medium

402
Write I/O Replication Instructions

404
Timer Association Instructions

406
Journal Write I/O Application Instructions

408
Journal Write Prevention Instructions

FIG. 4

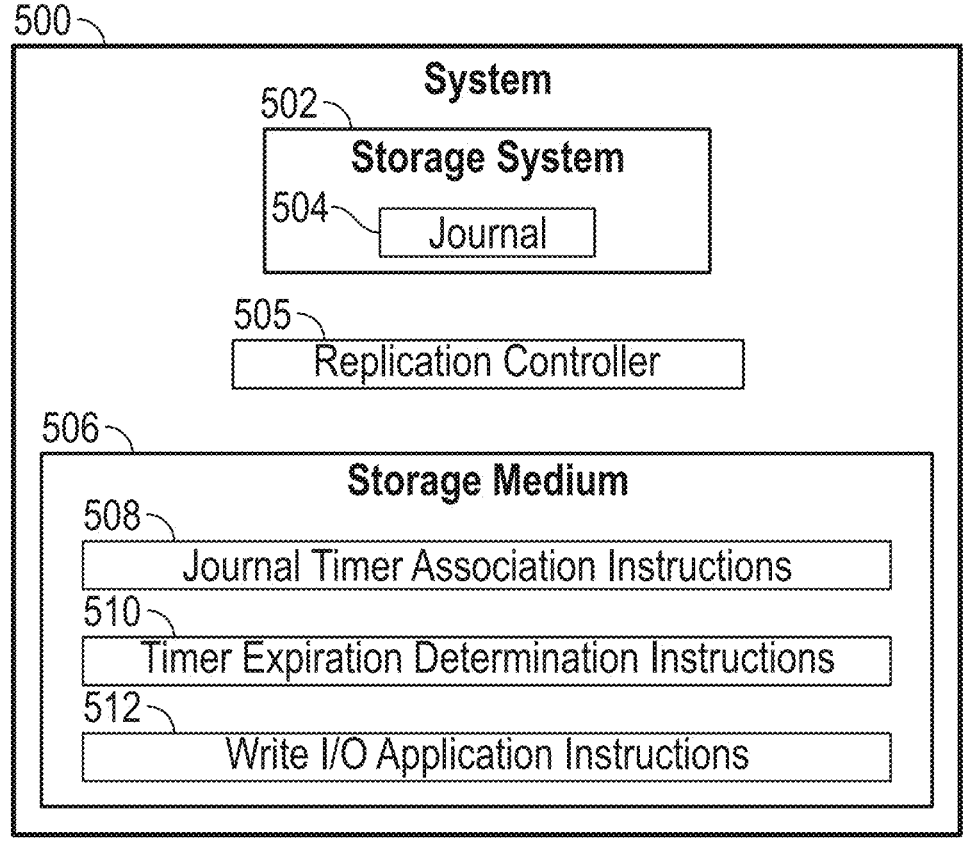

500

System

502
Storage System

504
Journal

505
Replication Controller

506
Storage Medium

508
Journal Timer Association Instructions

510
Timer Expiration Determination Instructions

512
Write I/O Application Instructions

FIG. 5

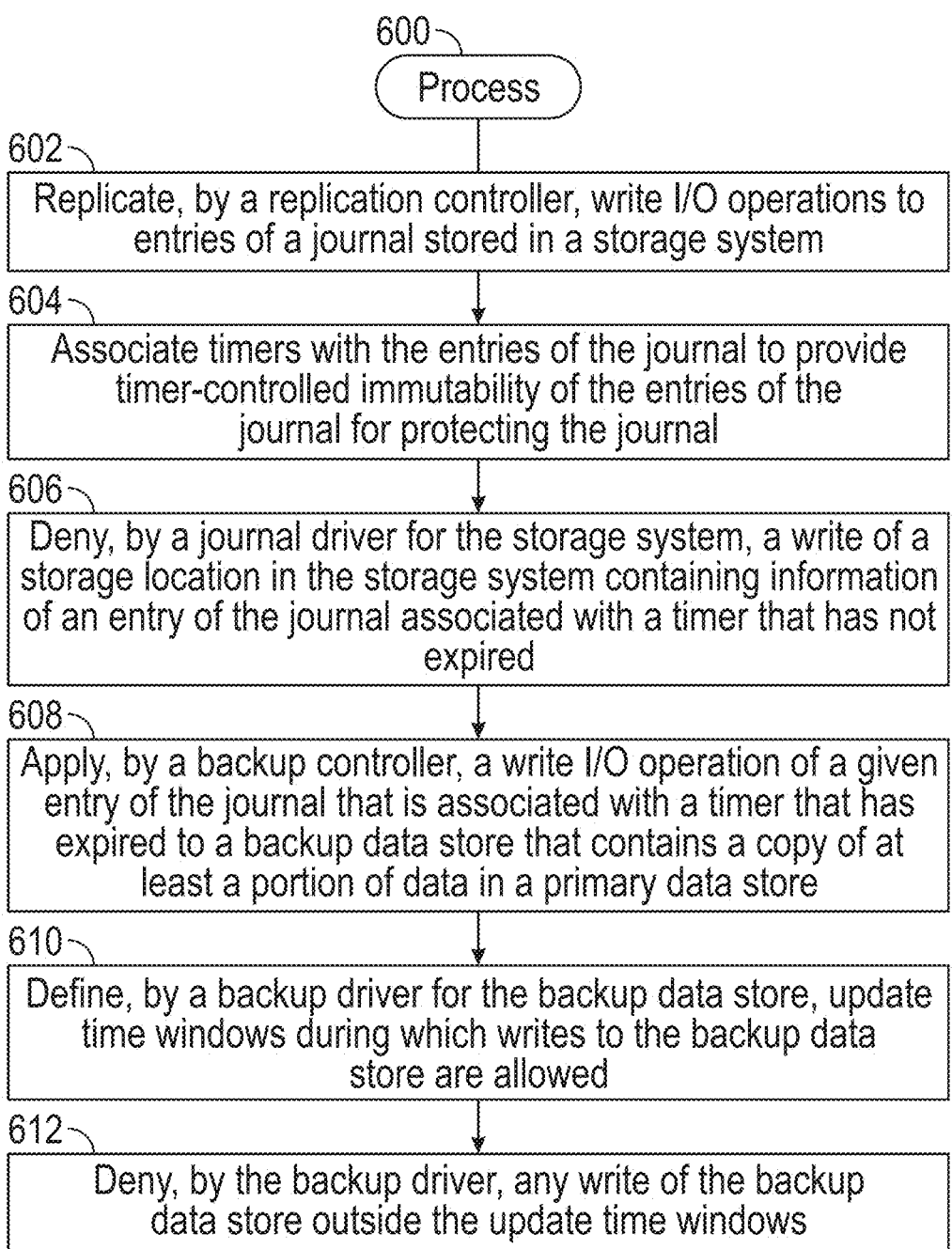

600 — Process

602 — Replicate, by a replication controller, write I/O operations to entries of a journal stored in a storage system 604 — Associate timers with the entries of the journal to provide timer-controlled immutability of the entries of the journal for protecting the journal 606 — Deny, by a journal driver for the storage system, a write of a storage location in the storage system containing information of an entry of the journal associated with a timer that has not expired 608 — Apply, by a backup controller, a write I/O operation of a given entry of the journal that is associated with a timer that has expired to a backup data store that contains a copy of at least a portion of data in a primary data store 610 — Define, by a backup driver for the backup data store, update time windows during which writes to the backup data store are allowed 612 — Deny, by the backup driver, any write of the backup data store outside the update time windows

FIG. 6

DATA PROTECTION USING A TIMER-CONTROLLED IMMUTABLE JOURNAL

BACKGROUND

A ransomware attack involves encrypting data on a computer or on multiple computers connected over a network. In a ransomware attack, data can be encrypted using an encryption key, which renders the data inaccessible to users unless a ransom is paid to obtain the encryption key. A ransomware attack can be highly disruptive to enterprises, including businesses, government agencies, educational organizations, individuals, and so forth

BRIEF DESCRIPTION OF THE DRAWINGS

Some implementations of the present disclosure are described with respect to the following figures.

FIG. 4 is a block diagram of a storage medium storing machine-readable instructions according to some examples.

FIG. 5 is a block diagram of a system according to some examples.

FIG. 6 is a flow diagram of a process according to some examples.

Figure 1:
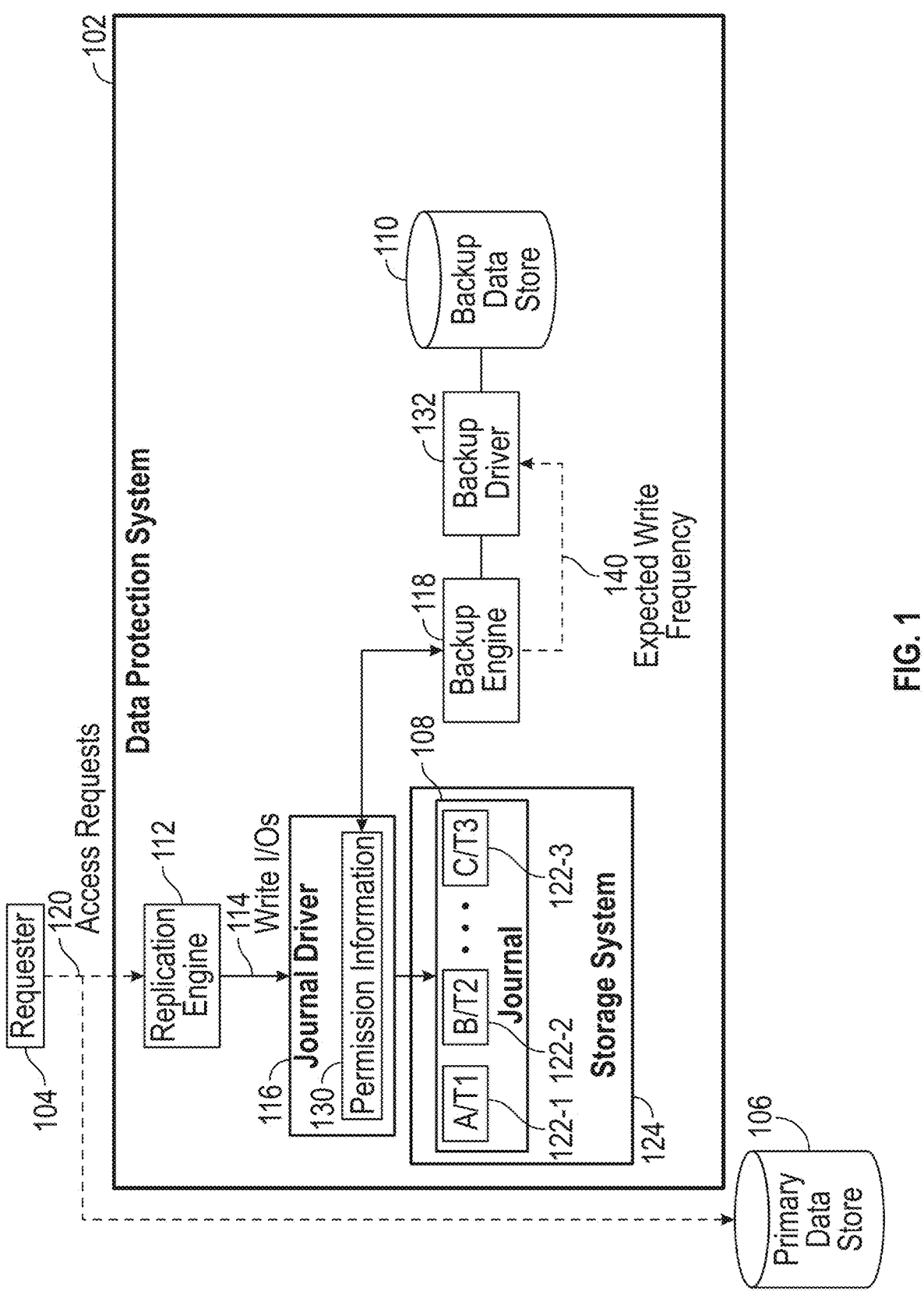
FIG. 1 is a block diagram of an arrangement including a data protection system, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A ransomware attack can target both primary data and backup data. Primary data is the data used during operations of a computing system. Backup data is based on replicating the primary data to a backup storage system. If the ransomware attack is successful in encrypting both the primary data and the backup data, then a user would not be able to restore the user's data using the backup data.

In accordance with some implementations of the present disclosure, protection systems or techniques are provided to render recovery data immutable under specified conditions, to protect the recovery data from unauthorized modification, such as by encryptions performed in ransomware attacks or other types of attacks. In some examples, the recovery data includes a journal and backup data. The journal includes entries to which write input/output (I/O) operations are replicated by a replication controller. The backup data is a copy of a version of primary data. In some examples, timers are associated with the entries of the journal to provide timer-controlled immutability of the entries of the journal. Upon expiration of a timer indicating that a specified time duration has elapsed since an I/O operation was added to an entry of the journal, the write I/O operation of the entry is applied to a backup data store that contains a copy of at least a portion of data in a primary data store. Prior to the expiration of the timer, any modification of the entry of the journal is blocked.

The journal is stored in a storage system, such as a disk-based storage system, a solid-state drive, or another type of storage system. A "timer-controlled immutability" of an entry of the journal can refer to rendering a storage location (of the storage system) containing the entry unchangeable until a condition associated with the timer is satisfied, e.g., the timer expires after counting a specified amount of time, or the timer reaches a specified threshold value. A "journal" can refer to a data structure that logs write I/O operations that modify data items, where a "data item" can refer to a unit of data, such as a data chunk, a file, a data object, or any other unit of data. A write I/O operation can update data, add new data, or delete existing data. More generally, a write I/O operation can refer to any I/O operation that when executed causes data to change. Adding a write I/O operation to an entry of the journal can refer to adding information representing the write I/O operation to the entry of the journal.

FIG. 1 is a block diagram of an example arrangement that includes a data protection system 102 according to some implementations of the present disclosure. The data protection system 102 can be implemented using one or more computers. A requester 104 is able to request data access operations with respect to a primary data store 106. Data access operations can include read operations and write operations. An example of the requester 104 is a virtual compute entity, such as a virtual machine (VM) or a container. In other examples, the requester 104 can include a program or a hardware component.

A primary data store 106 is a data store for storing data used in operations of the requester 104, such as when the requester 104 is executing workloads of application programs, an operating system (OS), or other programs. The primary data store 106 can be contained in a storage system including one or more storage devices, such as disk-based storage devices, flash memory devices, or other types of storage devices. Although just one requester is shown in FIG. 1, in other examples, there may be multiple requesters that can access data of the primary data store 106.

The data protection system 102 includes a journal 108 and a backup data store 110. Each of the journal 108 and the backup data store 110 can be contained in a storage system. Together, the journal 108 and the backup data store 110 form a recovery store from which data of the primary data store 106 can be recovered in case of a fault or failure of the primary data store 106 that results in loss of data. The backup data store 110 contains copies of data items in the primary data store 106. However, the backup data store 110 may not be up to date with respect to the primary data store 106, since changes to data caused by write I/O operations 114 may be logged in the journal 108 but not yet applied to the backup data store 110. For example, the backup data store 110 may not include the following data items: new data items that have been added to the primary data store 106 by write I/O operations, or data items in the primary data store 106 that have been modified by write I/O operations. As a further example, the backup data store 110 may include data items that have been deleted by write I/O operations to the primary data store 106. More generally, the data stored in the backup data store 110 is an earlier version of the data in the primary data store 106.

More specifically, the data stored in the backup data store 110 is an earlier version by a journal history length duration than the data in the primary data store 106. The "journal history length duration" refers to the amount of time that a journal entry is kept in the journal 108 before being applied to the backup data store 110. Thus, any data item in the backup data store 110 may be out of date with respect to the primary data store 106 by the journal history length duration.

The primary data store 106, the journal 108, and the backup data store 110 may be stored at different physical locations (e.g., different physical facilities, different cities, different states, different countries, or other different geographic locations). In other examples, the journal 108 and the primary data store 106 may be at the same physical location, or the journal 108 and the backup data store 110 may be at the same physical location, or the journal 108, the primary data store 106, and the backup data store 110 may be at the same physical location.

The data protection system 102 includes a replication engine 112 that is to replicate write I/O operations 114 through a journal driver 116 to the journal 108. The data protection system 102 also includes a backup engine 118 that applies write I/O operations represented by journal entries in the journal 108 to the backup data store 110.

In some examples, the backup engine 118 can be the same as the replication engine 112. In other examples, the backup engine 118 can be a different instance of the replication engine 112 at a different location, such as at a backup location that is separate from a location at which the primary data store 106 and the replication engine 112 are located.

The requester 104 issues access requests 120 to access (read or write) data of the primary data store 106. Although not shown, an intermediate layer exists between the requester 104 and the primary data store 106. In some examples, the intermediate layer can include a hypervisor that creates and manages VMs. In other examples, the intermediate layer can include an operating system (OS) of a computer system. The intermediate layer includes a driver that can convert between the access requests 120 (read requests or write requests) and corresponding I/O operations (read I/O operations or write I/O operations).

The replication engine 112 detects and sends write I/O operations 114 to the journal driver 116 for replicating the write I/O operations 114 to the journal 108. The journal driver 116 is an entity that manages access of a storage system 124 containing the journal 108. The journal driver 116 is separate from the driver for the primary data store 106.

In accordance with some examples of the present disclosure, in response to receiving a write I/O operation 114 that is to be replicated to the journal 108, the journal driver 116 determines whether an entity (e.g., the replication engine 112) that submitted the write I/O operation 114 has permission to update the journal 108. The journal driver 116 can be configured with permission information 130 that identifies one or more entities allowed to update the journal 108. The permission information 130 may be stored in a memory accessible by the journal driver 116. The permission information 130 can include an identifier of the replication engine 112, and indicates the permission associated with the replication engine 112. In some examples, a permission can include a read-only permission or a read-write permission. The read-only permission grants an entity permission to read (but not write) the journal 108. The read-write permission grants an entity authorization to both read and write to the journal 108.

The permission information 130 can indicate that the replication engine 112 has read-write access of the journal 108. In some examples, the permission information 130 can also indicate that the backup engine 118 has read-only access of the journal 108. In other examples, the information 130 can indicate that the backup engine 118 has read-write access of the journal 108 (discussed further below).

The journal driver 116 will reject any attempt by an entity without permission to access the journal 108. For example, if ransomware or malware (or any other unauthorized entity) in the system attempts to write to the journal 108, the journal driver 116 will reject this write attempt based on the permission information 130 not indicating that the unauthorized entity has permission to write to the journal 108. As a result, the unauthorized entity would not be able to change journal entries of the journal 108, including updating the journal entries or deleting the journal entries.

Further protection of the journal 108 is provided by making journal entries of the journal 108 immutable for a specified time duration, which is the journal history length duration noted above. Making journal entries immutable for the specified time duration protects against attacks that can perform large quantities of writes (e.g., of encrypted data) in a short amount of time. If the requester 104 is an attacker (such as ransomware), a large quantity of write I/O operations may be issued by the requester 104. Without the protection offered by the data protection system 102 according to some examples of the present disclosure, the large quantity of write I/O operations from the attacker replicated to the journal 108 may overwrite content of existing journal entries of the journal 108.

Note that the protections noted above provided by the journal driver 116 based on the permission information 130 and based on the timer-controlled immutability of the journal 108 are in addition to an access control mechanism implemented by an OS or another system module (e.g., a hypervisor). The access control mechanism is to ensure that requesters of data have permissions to do so. The journal driver 116 and the timer-controlled immutability of the journal 108 provide protection in case the access control mechanism of the OS or another system module failed, and an unauthorized entity was able to gain access to the journal 108. In fact, even the journal driver 116 itself may be fooled into allowing the unauthorized entity access to the journal 108, in which case the timer-controlled immutability of the journal 108 provides a further layer of protection against unauthorized modification of the journal 108 and the backup data store 110.

In the example shown in FIG. 1, the journal 108 includes journal entries 122-1, 122-2, and 122-3. Although three journal entries are shown, in other examples, the journal 108 can include a different quantity of journal entries. In some examples, the journal 108 is a first-in-first-out (FIFO) data structure that adds information of the write I/O operations 114 in a FIFO manner. In the example shown in FIG. 1, the journal entry 122-3 was added to the journal 108 before the journal entry 122-2, and the journal entry 122-2 was added to the journal 108 before the journal entry 122-1. Following the FIFO order, an earlier added journal entry (e.g., 122-3) would be applied by the backup engine 118 to the backup data store 110 before a later added journal entry (e.g., 122-2 or 122-1).

Information representing a write I/O operation in a journal entry includes: (1) write operation information specifying the type of write (e.g., update, add, or delete) and the storage address of the write (such as to a storage block); and (2) the write data that is the subject of the write I/O operation. In the example of FIG. 1, the journal entry 122-1 includes information representing a write of data item A, the journal entry 122-2 contains information representing a write of data item B, and the journal entry 122-3 contains information representing a write of data item C. In some examples, each data item includes data in a storage block of the storage system containing the primary data store 106. A "storage block" refers to a portion of the storage system of a specified size.

In accordance with some examples of the present disclosure, each journal entry also includes a timer, such as a timer T1 in the journal entry 122-1, a timer T2 in the journal entry 122-2, and a timer T3 in the journal entry 122-3. Each respective timer is started in response to adding the journal entry to the journal 108. Thus, for example, the timer T2 is started in response to the journal entry 122-2 being added for the write of the data item B. Although FIG. 1 shows a timer as being included in a respective journal entry, in other examples, the timer is associated with but separate from the respective journal entry.

Starting a timer can refer to initializing the timer to zero or some other low value. The timer is then incremented as time advances. Alternatively, starting a timer can refer to initiating the timer to a specified non-zero value; the timer decrements from the specified non-zero value. In either case, the timer advances (increments or decrements) with time until the specified time duration has elapsed, at which point the timer expires.

Each timer is considered a time-to-live (TTL) timer that controls the amount of time that the respective journal entry stays in the journal 108. When different journal entries are added to the journal 108 at different times, the timers that are associated with these of the journal 108 entries will have different values since the timers were started at different times.

In some examples, when a timer expires (a decrementing timer has reached zero or an incrementing timer has reached a target time value), the timer can issue an indication (e.g., a signal, an interrupt, a message, or any other type of indicator) to the backup engine 118. Alternatively, the backup engine 118 can continually poll the journal entries to detect which entries have expired timers.

In some examples, the backup engine 118 has read access (as indicated by the permission information 130) of the journal 108. With this read access, the backup engine 118 is able to read the journal entries 122-1 to 122-3.

In response to detecting the expiration of a timer, the backup engine 118 reads information of the journal entry associated with the expired timer. The reading of the journal entry is performed by issuing a read request to the journal driver 116 for the storage system 124. The backup engine 118 applies the write I/O operation represented by the information read from the journal entry to the backup data store 110. Applying a write I/O operation to the backup data store 110 includes updating a data item in the backup data store 110, deleting a data item in the backup data store 110, or adding a data item to the backup data store 110.

The backup engine 118 issues a write request for the write I/O operation represented by a journal entry to a backup driver 132 for the backup data store 110. The backup driver 132 is an entity that manages access of a storage system containing the backup data store 110. The backup driver 132 may be separate from the journal driver 116 for the storage system 124 containing the journal 108, and is separate from the driver for the primary data store 106. In further examples, the backup driver 132 and the journal driver 116 may be the same.

In some examples, as part of applying the journal entry, the backup engine 118 can remove the journal entry from the journal 108 (assuming the backup engine 118 has read-write access to the journal 108 as indicated by the permission information 130). Removing the journal entry from the journal 108 frees up the underlying storage location of the storage system 124 for use by another entry that may be later added to the journal 108. To remove a journal entry, the backup engine 118 can issue a delete request to the journal driver 116 for deleting the journal entry.

In other examples, instead of removing a journal entry upon expiration of the timer of the journal entry, the backup engine 118 can mark the given journal entry as mutable (such as in metadata associated with the journal 108), which means that the journal driver 116 can overwrite a storage location occupied by the given journal entry marked as mutable. Marking a journal entry as mutable can be accomplished by setting a flag associated with the journal entry to indicate that the storage location for the journal entry can be overwritten.

In some examples, the storage system 124 is a block-based storage system that stores data in storage blocks. An entry of the journal 108 can be stored in one or more storage blocks. Alternatively, multiple entries can be stored in one storage block. In some examples, a "storage location" of the storage system 124 that stores an entry of the journal 108 can include one or more storage blocks, or a section of a storage block.

Figure 2:
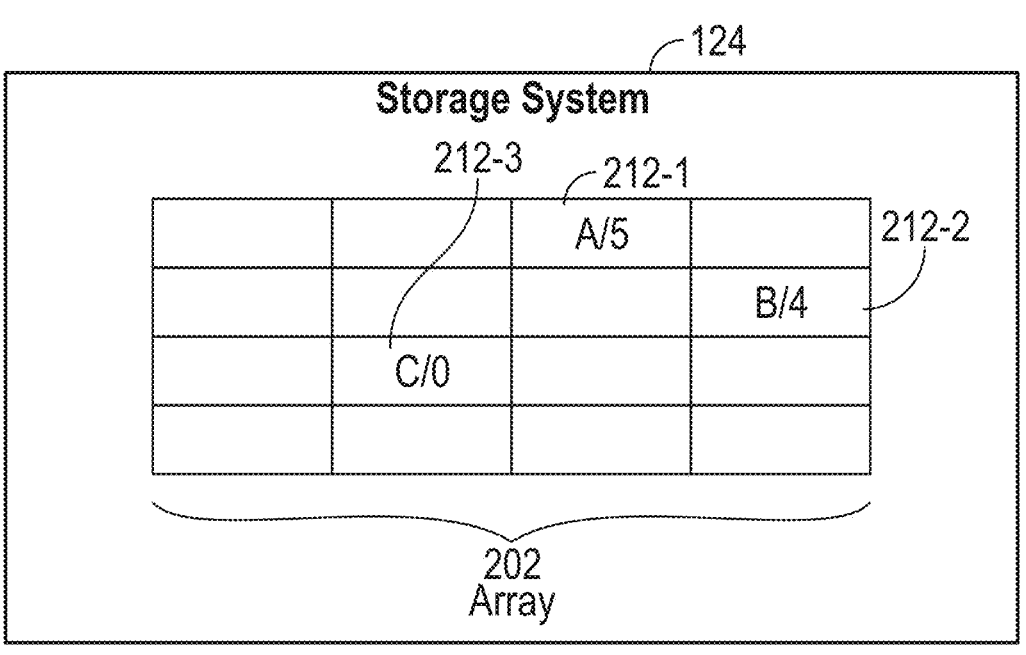
FIG. 2 is a block diagram of an array of storage locations storing journal entries, according to some examples.

FIG. 2 shows an array 202 of storage locations of the storage system 124. Each storage location of the array 202 is represented by a rectangular box in FIG. 2. In the example of FIG. 2, a storage location 212-1 stores a journal entry for data item A, a storage location 212-2 stores a journal entry for data item B, and a storage location 212-3 stores a journal entry for data item C. The timer in the journal entry for data item C has value 0 (which means that this timer has expired assuming the timer is a decrementing timer), the timer in the journal entry for data item B has value 4, and the timer in the journal entry for data item A has value 5.

Before expiration of a timer of a given journal entry, any attempts to overwrite a storage location of the given journal entry is denied by the journal driver 116. For example, the journal driver 116 would deny any attempt at overwriting the storage locations 212-1 and 212-2 since the timers of the journal entries stored in those storage locations have not yet expired. However, the journal driver 116 would permit overwriting of the storage location 212-3 since the timer of the journal entry for data item A has expired.

Once the timer of the given entry has expired and the backup engine 118 has applied the write I/O operation represented by the given entry to the backup data store 110, the journal driver 116 would allow new data (e.g., a new journal entry) to overwrite the storage location previously occupied by the given entry.

In addition to protecting the journal 108 by allowing just the replication engine 112 to write to the journal 108 and by making journal entries immutable for the journal history length duration, the data protection system 102 according to some examples of the present disclosure also protects the backup data store 110 from attack.

For example, the backup driver 132 can permit just the backup engine 118 write access to the backup data store 110. Any attempt by another entity without write access would be denied by the backup driver 132.

Figure 3:
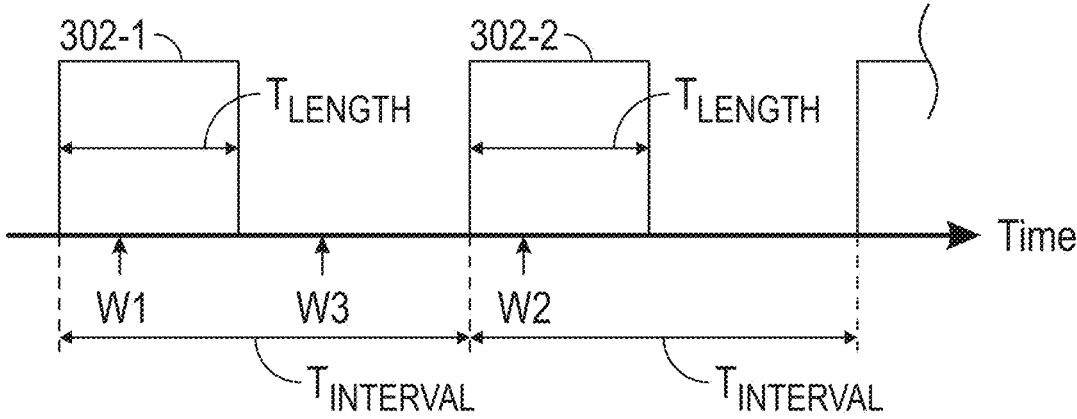
FIG. 3 is a timing diagram illustrating update time windows during which writes of a backup data store are allowed, according to some examples.

A further protection of the backup data store 110 is accomplished by allowing writes to the backup data store 110 during specified update time windows. FIG. 3 shows example update time windows 302-1 and 302-2. Writes to the backup data store 110 are allowed during each update time window 302-1 or 302-2. Write request W1 is an example of a write request issued during the update time window 302-1, and write request W2 is an example of a write request issued during the update time window 302-2. Both write requests W1 and W2 (assuming they are from the backup engine 118) would be allowed by the backup driver 132.

Any writes outside of the specified update time windows (such as writes initiated by attackers) would be denied by the backup driver 132. Write request W3 is an example of a write request outside the update time windows 302-1 and 302-2. The backup driver 132 would deny write request W3.

The specified update time windows can be based on an expected write frequency 140 set by the backup engine 118. The backup engine 118 can notify the backup driver 132 of the expected write frequency 140 pertaining to how frequently journal entries are to be applied to the backup data store 110. The expected write frequency 140 can be once per every four hours (or any other specified time interval $T_{INTERVAL}$). Assuming the expected write frequency 140 is once per four hours (i.e., $T_{INTERVAL}$ is four hours), the backup driver 132 can define one update time window every four hours, where the update time window has a length ($T_{LENGTH}$) that is equal to the expected amount of time normally taken to apply journal entries to the backup data store 110. The expected amount of time normally taken to apply journal entries to the backup data store 110 depends on the average quantity of journal entries that would normally be added to the journal 108 during the four-hour time interval. This average quantity of journal entries can be derived empirically based on historical data, or may be set by a human administrator or another entity.

In some examples, the backup engine 118 can also explicitly notify the backup driver 132 when writing of the backup data store 110 starts. The backup driver 132 also notifies the backup driver 132 when writing of the backup data store 110 ends. If the backup driver 132 receives a write request before the write start notification or after the write end notification, the backup driver 132 would deny the write request as likely being an unauthorized write request.

In further examples, each of the journal driver 116 and the backup driver 132 can detect an attempted modification of the journal 108 or the backup data store 110, respectively, that violates an access rule. For example, the journal driver 116 can detect that an entity not identified by the permission information 130 has attempted to write the journal 108. As a further example, the journal driver 116 can detect that an entity attempted to modify a storage location for a journal entry prior to a timer associated with the journal entry expiring.

As another example, the backup driver 132 can detect that an entity not permitted to write to the backup data store 110 has attempted to write to the backup data store 110. Further, the backup driver 132 can detect that an entity has issued a write request to the backup data store 110 outside an update time window, or that an entity has issued a write request before a write start notification or after a write end notification from the backup engine 118. Based on detecting the attempted modification of either the journal 108 or the backup data store 110 that violates the access rule, the journal driver 116 or the backup driver 132 can issue an alert of the violation. In response to the alert, the journal driver 116 will disable any further writes to the journal 108, and the backup driver 132 will disable any further writes to the backup data store 110. At this point, an administrator or another entity can investigate what caused the alert to determine whether an attack has occurred.

FIG. 4 is a block diagram of a non-transitory machine-readable or computer-readable storage medium 400 storing data protection instructions that upon execution cause a system to perform various actions. The system can be the data protection system 102 of FIG. 1.

The data protection instructions include write I/O replication instructions 402 to replicate write I/O operations to journal entries of a journal stored in a storage system, such as the journal 108 stored in the storage system 124 of FIG. 1. The write I/O replication instructions can be part of the replication engine 112 of FIG. 1, for example.

The data protection instructions include timer association instructions 404 to associate timers with the entries of the journal to provide timer-controlled immutability of the entries of the journal. For example, the timer association instructions 404 can be part of the journal driver 116, which can start a timer as an entry is added to the journal as part of replicating a write I/O operation to the journal.

The data protection instructions include journal write I/O application instructions 406 to, based on a first timer associated with a first entry of the journal indicating that a specified time duration has elapsed (i.e., the first timer has expired), apply a first write I/O operation of the first entry to a backup data store that contains a copy of at least a portion of data in a primary data store. The journal write I/O application instructions 406 can be part of the backup engine 118 of FIG. 1, for example.

The data protection instructions include journal write prevention instructions 408 to, prior to the first timer indicating that the specified time duration has elapsed, prevent any modification of a storage location containing the first entry in the storage system. In some examples, the storage location can include one or more storage blocks of the storage system, or a portion of a storage block.

In some examples, the replicating is performed with a replication controller, and the data protection instructions can prevent any modification of the storage location requested by any requester including the replication controller, if the storage location stores information for a journal entry associated with a timer that has not yet expired. An example of the replication controller is the replication engine 112 of FIG. 1. As used here, a "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, a "controller" can refer to a combination of one or more hardware processing circuits and machine-readable instructions (software and/or firmware) executable on the one or more hardware processing circuits.

In some examples, the data protection instructions can enable a modification of the storage location in response to the first timer indicating that the specified time duration has elapsed and detecting that the first write I/O operation of the first entry has been applied to the backup data store.

In some examples, the modification of the storage location includes adding a new write I/O operation to a new entry of the journal, the new entry stored in the storage location.

In some examples, the data protection instructions can start a timer associated with the new entry.

In some examples, the preventing of any modification of the first entry is performed by a driver that controls access to the storage system. An example of the driver is the journal driver 116 of FIG. 1.

In some examples, the data protection instructions can prevent any write to the backup data store outside of an update time window, such as any of the update time windows 302-1 and 302-2 shown in FIG. 3.

In some examples, the preventing of any write to the backup data store outside of the update time window is performed by a driver (e.g., the backup driver 132 of FIG. 1). The driver can determine the update time window based on a notification of an expected write frequency (e.g., 140 in FIG. 1) of the backup data store.

In some examples, the driver is to allow writes of the backup data store during the update time window.

In some examples, the driver is to allow the writes of the backup data store during the update time window from a backup controller, and the driver is to deny any other write of the backup data store during the update time window from a requester different from the backup controller. An example of the backup controller is the backup engine 118 of FIG. 1.

In some examples, the data protection instructions can notify a driver (e.g., 132 in FIG. 1) for the backup data store of a start and an end of writes by a backup controller of the backup data store. The driver denies any write of the backup data store before the start or after the end of the writes by the backup controller.

In some examples, the data protections instructions can detect an attempted modification of either the journal or the backup data store that violates an access rule. Based on detecting the attempted modification of either the journal or the backup data store that violates the access rule, the data protections instructions disable writes to both the journal and the backup data store.

In some examples, the violation of the access rule includes the attempted modification attempting to modify a storage location for an entry of the entries of the journal prior to a timer associated with the entry indicating that the specified time duration has elapsed.

In some examples, the violation of the access rule includes the attempted modification attempting to write to the backup data store outside the specified update time window.

FIG. 5 is a block diagram of a system 500 according to some examples. The system 500 can be the data protection system 102 of FIG. 1, for example.

The system 500 includes a storage system 502 containing a journal 504. The system 500 includes a replication controller 505 to replicate write I/O operations to entries of the journal. An example of the replication controller 505 is the replication engine 112 of FIG. 1.

The system 500 includes a storage medium 506 storing data protection instructions executable by a processing resource to perform various actions. A processing resource can include one or more hardware processors. A hardware processor can include a microprocessor, a core of a multi-core microprocessor, a microcontroller, a programmable integrated circuit, a programmable gate array, or another hardware processing circuit.

The data protection instructions include journal timer association instructions 508 to associate timers with the entries of the journal to provide timer-controlled immutability of the entries of the journal, where a timer associated with an entry is to advance with time, and where a first entry of the entries is associated with a first timer having a first time value, and a second entry of the entries is associated with a second timer having a second time value different from the first value.

The data protection instructions include timer expiration determination instructions 510 to determine whether any of the timers has expired. A timer expires if the timer has decremented to zero or some other low value, or if the timer has incremented to a target value.

The data protection instructions include write I/O application instructions 512 to apply a write I/O operation of a given entry of the entries that is associated with a timer that has expired to a backup data store that contains a copy of at least a portion of data in a primary data store.

In some examples, the data protection can deny any modification of a storage location containing information of an entry of the journal associated with a timer that has not expired.

In some examples, the data protection instructions allow a modification of a storage location containing information of the given entry based on the timer associated with the given entry expiring and based on the write I/O operation of the given entry being applied to the backup data store.

In some examples, the data protection instructions can define update time windows during which writes of the backup data store are allowed, and the data protection instructions can deny any write request issued outside the update time windows.

FIG. 6 is a flow diagram of a process 600 according to some examples of the present disclosure. Although FIG. 6 shows a sequence of tasks, note that the tasks may be performed in a different order in other examples, some of the tasks may be omitted, and other tasks may be added.

The process 600 includes replicating (at 602), by a replication controller, write I/O operations to entries of a journal stored in a storage system. Replicating a write I/O operation to a journal entry includes writing information representing the write I/O operation to a storage location in the storage system, where the storage location is allocated to store the journal entry.

The process 600 includes associating (at 604) timers with the entries of the journal to provide timer-controlled immutability of the entries of the journal for protecting the journal.

The process 600 includes denying (at 606), by a journal driver for the storage system, a write of a storage location in the storage system containing information of an entry of the journal associated with a timer that has not expired.

The process 600 includes applying (at 608), by a backup controller, a write I/O operation of a given entry of the journal that is associated with a timer that has expired to a backup data store that contains a copy of at least a portion of data in a primary data store.

The process 600 includes defining (at 610), by a backup driver for the backup data store, update time windows during which writes to the backup data store are allowed. The update time windows are defined within respective time intervals corresponding to an expected write frequency of the backup data store.

The process 600 includes denying (at 612), by the backup driver, any write of the backup data store outside the update time windows.

As used here, a "data store" can refer to any repository of data. An "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

A storage medium (e.g., 400 in FIG. 4 or 506 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM), or a flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising data protection instructions that upon execution cause a system to:

replicate write input/output (I/O) operations to entries of a journal stored in a storage system;

associate timers with the entries of the journal to provide timer-controlled immutability of the entries of the journal;

based on a first timer associated with a first entry of the entries of the journal indicating that a specified time duration has elapsed, apply a first write I/O operation of the first entry to a backup data store that contains a copy of at least a portion of data in a primary data store; and prior to the first timer indicating that the specified time duration has elapsed, prevent any modification of a storage location containing the first entry in the storage system;

prevent any write to the backup data store outside of an update time window, wherein the preventing of any write to the backup data store outside of the update time window is performed by a driver, and wherein the driver is to determine the update time window based on a notification of an expected write frequency of the backup data store.

2. The non-transitory machine-readable storage medium of claim 1, wherein the replicating is performed with a replication controller, and the data protection instructions upon execution cause the system to:

prevent any modification of the storage location requested by any requester including the replication controller.

3. The non-transitory machine-readable storage medium of claim 1, wherein the data protection instructions upon execution cause the system to:

enable a modification of the storage location in response to the first timer indicating that the specified time duration has elapsed and detecting that the first write I/O operation of the first entry has been applied to the backup data store.

4. The non-transitory machine-readable storage medium of claim 3, wherein the modification of the storage location comprises adding a new write I/O operation to a new entry of the journal, the new entry stored in the storage location.

5. The non-transitory machine-readable storage medium of claim 4, wherein the data protection instructions upon execution cause the system to:

start a timer associated with the new entry.

6. The non-transitory machine-readable storage medium of claim 1, wherein the preventing of any modification of the first entry is performed by a driver that controls access to the storage system.

7. The non-transitory machine-readable storage medium of claim 1, wherein the driver is to allow writes of the backup data store during the update time window.

8. The non-transitory machine-readable storage medium of claim 7, wherein the driver is to allow the writes of the backup data store during the update time window from a backup controller, and the driver is to deny any other write of the backup data store during the update time window from a requester different from the backup controller.

9. The non-transitory machine-readable storage medium of claim 1, wherein the data protection instructions upon execution cause the system to:

notify the driver for the backup data store of a start and an end of writes by a backup controller of the backup data store, wherein the driver is to deny any write of the backup data store before the start or after the end of the writes by the backup controller.

10. The non-transitory machine-readable storage medium of claim 1, wherein the data protection instructions upon execution cause the system to:

detect an attempted modification of either the journal or the backup data store that violates an access rule; and based on detecting the attempted modification of either the journal or the backup data store that violates the access rule, disable writes to both the journal and the backup data store.

11. The non-transitory machine-readable storage medium of claim 10, wherein the violation of the access rule comprises the attempted modification attempting to modify a storage location for an entry of the entries of the journal prior to a timer associated with the entry indicating that the specified time duration has elapsed.

12. The non-transitory machine-readable storage medium of claim 10, wherein the violation of the access rule comprises an attempt to write to the backup data store outside the update time window.

13. A computer implemented method comprising:

replicating write input/output (I/O) operations to entries of a journal stored in a storage system;

associating timers with the entries of the journal to provide timer-controlled immutability of the entries of the journal;

based on a first timer associated with a first entry of the entries of the journal indicating that a specified time duration has elapsed, applying a first write I/O operation of the first entry to a backup data store that contains a copy of at least a portion of data in a primary data store; and prior to the first timer indicating that the specified time duration has elapsed, preventing any modification of a storage location containing the first entry in the storage system;

preventing any write to the backup data store outside of an update time window, wherein the preventing of any write to the backup data store outside of the update time window is performed by a driver, and wherein the driver is to determine the update time window based on a notification of an expected write frequency of the backup data store.

14. The computer implemented method of claim 13, wherein the driver is to allow writes of the backup data store during the update time window.

15. The computer implemented method of claim 14, wherein the driver is to allow the writes of the backup data store during the update time window from a backup controller, and the driver is to deny any other write of the backup data store during the update time window from a requester different from the backup controller.

16. The computer implemented method of claim 13, further comprising:

notifying the driver for the backup data store of a start and an end of writes by a backup controller of the backup data store, wherein the driver is to deny any write of the backup data store before the start or after the end of the writes by the backup controller.

17. The computer implemented method of claim 13, further comprising:

detecting an attempted modification of either the journal or the backup data store that violates an access rule; and based on detecting the attempted modification of either the journal or the backup data store that violates the access rule, disabling writes to both the journal and the backup data store.

18. The computer implemented method of claim 17, wherein the violation of the access rule comprises the attempted modification attempting to modify a storage location for an entry of the entries of the journal prior to a timer associated with the entry indicating that the specified time duration has elapsed.

19. The computer implemented method of claim 17, wherein the violation of the access rule comprises an attempt to write to the backup data store outside the update time window.

* * * * *